United States Patent
Wang

(10) Patent No.: US 9,491,457 B2
(45) Date of Patent: Nov. 8, 2016

(54) SIGNALING OF REGIONS OF INTEREST AND GRADUAL DECODING REFRESH IN VIDEO CODING

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 574 days.

(21) Appl. No.: 14/010,054

(22) Filed: Aug. 26, 2013

(65) Prior Publication Data

US 2014/0092963 A1     Apr. 3, 2014

Related U.S. Application Data

(60) Provisional application No. 61/707,729, filed on Sep. 28, 2012.

(51) Int. Cl.
| | | |
|---|---|---|
| *H04N 19/50* | (2014.01) | |
| *H04N 19/70* | (2014.01) | |
| *H04N 19/61* | (2014.01) | |
| *H04N 19/107* | (2014.01) | |
| *H04N 19/174* | (2014.01) | |
| *H04N 19/167* | (2014.01) | |
| *H04N 19/23* | (2014.01) | |

(52) U.S. Cl.
CPC ...... *H04N 19/00569* (2013.01); *H04N 19/107* (2014.11); *H04N 19/167* (2014.11); *H04N 19/174* (2014.11); *H04N 19/23* (2014.11); *H04N 19/50* (2014.11); *H04N 19/61* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 7,552,227 | B2 * | 6/2009 | Wang | H04L 29/06 709/203 |
| 7,826,531 | B2 | 11/2010 | Wang et al. | |
| 8,300,690 | B2 | 10/2012 | Hannuksela | |
| 2004/0008766 | A1 * | 1/2004 | Wang | H04N 19/105 375/240.01 |
| 2008/0095228 | A1 | 4/2008 | Hannuksela et al. | |
| 2012/0127259 | A1 | 5/2012 | Mackie et al. | |
| 2012/0185570 | A1 * | 7/2012 | Bouazizi | H04N 21/44016 709/219 |
| 2013/0235152 | A1 * | 9/2013 | Hannuksela | H04N 19/00769 348/43 |
| 2014/0153636 | A1 * | 6/2014 | Esenlik | H04N 19/00066 375/240.02 |
| 2014/0334557 | A1 * | 11/2014 | Schierl | H04N 19/91 375/240.27 |

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

(Continued)

*Primary Examiner* — Kevin McInnish

(74) *Attorney, Agent, or Firm* — Shumaker & Sieffert, P.A.

(57) ABSTRACT

During a coding process, systems, methods, and apparatus may code information indicating whether gradual decoder refresh (GDR) of a picture is enabled. When GDR is enabled, the coding process, systems, methods, and apparatus may code information that indicates whether one or more slices of the picture belong to a foreground region of the picture. In another example, during a coding process, systems, methods, and apparatus may decode video data corresponding to an ISP identification (ISP ID) for one of the ISPs for slices of a picture. The systems, methods, and apparatus may decode video data corresponding to an ROI using the ISP.

30 Claims, 6 Drawing Sheets

(56) References Cited

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Hannuksela et al., "Isolated Regions in Video Coding," IEEE Transactions on Multimedia, vol. 6, No. 2, Apr. 2004, 9 pp.
International Search Report and Written Opinion—PCT/US2013/056859—ISA/EPO—Nov. 11, 2013, 16 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Wang et al., "AHG9: Signalling of regions of interest and gradual decoding refresh," MPEG Meeting; Shanghai; (Motion Picture Expert Group or ISO/IEC JTC1/SC29/WG11) Document JCTVC-K0128, Oct. 1, 2012, 4 pp.
Wang et al., "AHG9: Signalling of regions of interest and gradual decoding refresh," MPEG Meeting; Shanghai; (Motion Picture Expert Group or ISO/IEC JTC1/SC29/WG11) Document JCTVC-K0128r2, Oct. 10-19, 2012, 6 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
ITU-T H.264, Series H: Audiovisual and Multimedia Systems, Infrastructure of audiovisual services—Coding of moving video, Advanced video coding for generic audiovisual services, The International Telecommunication Union, Mar. 2005, 343 pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Document No. JCTVC-K1003_v13, Oct. 10-19, 2012, 317 pp.
Second Written Opinion of international application No. PCT/US2013/056859, mailed Sep. 8, 2014, 9 pp.

\* cited by examiner

SIGNALING OF REGIONS OF INTEREST AND GRADUAL DECODING REFRESH IN VIDEO CODING

This application claims the benefit of U.S. Provisional Application No. 61/707,729, filed Sep. 28, 2012, the entire content of which is incorporated herein by reference.

TECHNICAL FIELD

This disclosure relates to video coding, and more particularly, to signaling of regions of interest and gradual decoding refresh in video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes video coding techniques. In particular, the techniques relate to encoding and decoding processes including signaling and processing information relating to regions of interest (ROIs), gradual decoding refresh (GDR) operations, or both. The techniques may be used in a variety of video coding processes, and may be especially useful in coding processes conforming to the High Efficiency Video Coding (HEVC) standard, mentioned above, which is presently under development, and with other video coding standards.

In one example, a disclosure describes a method of coding video data, the method comprising coding information indicating whether independent sub-pictures (ISPs) are enabled, when independent sub-pictures are enabled, coding information indicating an ISP identification (ISP IDs) for one of the ISPs, and coding video data corresponding to a region of interest (ROI) as one of the ISPs.

In another example, the disclosure describes a method of coding video data, the method comprising coding information indicating whether GDR of pictures is enabled, and when GDR is enabled, coding information indicating whether slices belong to a foreground region of a picture. A foreground region may also be referred to as a refreshed region, and a background region (a region that is not a foreground region) may also be referred to as a non-refreshed region.

The disclosure also describes devices for performing the methods including video encoders configured to perform the methods, video decoders configured to perform the methods, and devices having means for performing the methods, as well as computer-readable media comprising instructions to cause one or more processors to perform the methods.

The details of one or more examples are set forth in the accompanying drawings and the description below. Other features, objects, and advantages will be apparent from the description and drawings, and from the claims.

DETAILED DESCRIPTION

Figure 1:
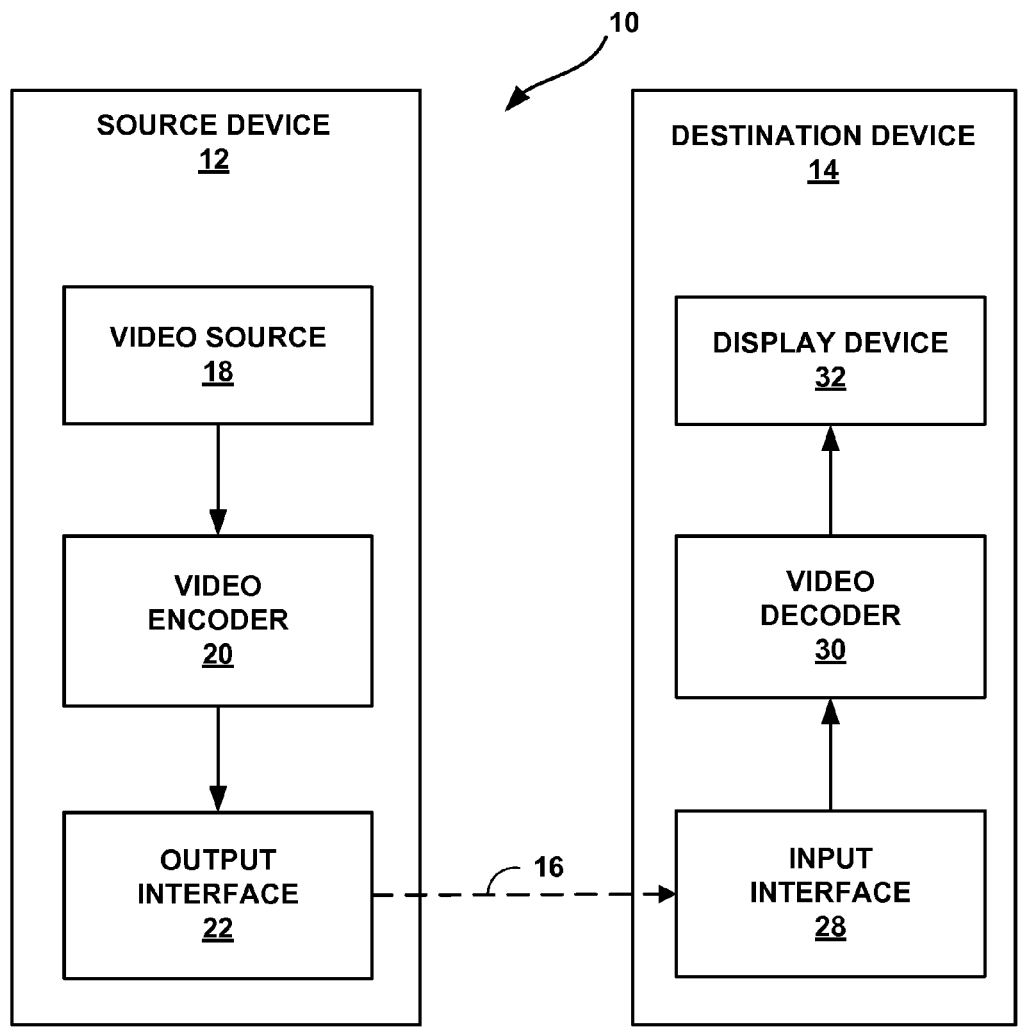
FIG. 1 is a block diagram illustrating an example video encoding and decoding system that may utilize techniques for signaling regions of interest (ROIs), gradual decoding refresh (GDR), or both as described in this disclosure.

This disclosure describes various techniques for signaling and processing of information relating to regions of interest (ROIs), gradual decoding refresh (GDR), or both operations in a video coding process. Accordingly, some example implementations may signal information related to GDR. Other example implementations may signal information related to ROIs. In yet another example, as described herein, some example implementations may signal information related to both GDR and ROI. The techniques may be performed, in some aspects, by a video encoder. In other aspects, the techniques may be performed by a video decoder. In addition, such methods could be performed in other devices, such as transcoders, media aware network elements (MANEs), or the like. In this disclosure, the techniques will be described with respect to video encoders and decoders for purposes of illustration.

In accordance with this disclosure, in one example, during a coding process, systems, methods, and apparatus may code information indicating whether GDR of pictures is enabled and, when GDR is enabled, code information indicating whether slices belong to a foreground region of a picture. A foreground region may also be referred to as a refreshed region. In another example, during a coding process, systems, methods, and apparatus may code information indicating whether one or more ISPs are enabled.

In another example, when independent sub-pictures are enabled, these systems, methods, and apparatus may code information indicating an ISP ID for one of the ISPs and code video data corresponding to an ROI as one of the ISPs. Accordingly, an encoder may designate an ISP ID for the ROI and include ROI information in the bitstream wherein the ROI information may indicate which ISP ID corresponds to the ROI. Further, because each ROI may be coded as an ISP, when a particular ISP corresponding to an ROI is the only region desired, slices not belonging to the ISP in each picture can be discarded.

Some example systems, methods, and apparatus may perform both of these.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, the High-Efficiency Video Coding (HEVC) standard is being developed by the Joint Collaboration Team on Video Coding (JCT-VC) of ITU-T Video Coding Experts Group (VCEG) and ISO/IEC Motion Picture Experts Group (MPEG). A recent draft of the HEVC standard, referred to as "HEVC Working Draft 8" or "WD8," is described in document JCTVC-J1003v7, Bross et al., "High efficiency video coding (HEVC) text specification draft 8," Joint Collaborative Team on Video Coding (JCT-VC) of ITU-T SG16 WP3 and ISO/IEC JTC1/SC29/WG11, 10th Meeting: Stockholm, SE, 11-20 Jul., 2012, which, as of May 1, 2013, is downloadable from the following link: http://phenix.int-evry fr/jct/doc_end_user/documents/10_Stockholm/wg11/JCTVC-J1003-v8.zip.

Another draft of the HEVC standard, referred to as "HEVC Working Draft 9" or "WD9," is described in document JCTVC-K1003v13, Bross et al., "High efficiency video coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, 10-19 Oct., 2012, which, as of Dec. 27, 2012, is downloadable from the following link: http://phenix.int-evry.fr/jct/doc_end_user/documents/11_Shanghai/wg11/JCTVC-K1003-v13.zip, the entire content of which is incorporated herein by reference. The entire contents of HEVC WD8 and WD9 are incorporated herein by reference.

In a video coding process, supplemental enhancement information (SEI) messages enable encoders to include metadata in the bitstream that is not required for correct decoding of the sample values of the output pictures but can be used for various other purposes, such as picture output timing and display, as well as loss detection and concealment. Encoders can include any number of SEI network abstraction layer (NAL) units in an access unit, and each SEI NAL unit may contain one or more SEI messages.

The HEVC standard, e.g., as presented in HEVC WD8, includes the syntax and semantics for several SEI messages, but the handling of the SEI messages is not specified, because SEI message do not affect the normative decoding process. One reason to have SEI messages in the HEVC standard is to enable supplemental data to be interpreted identically in different systems using HEVC. Specifications and systems using HEVC may require encoders to generate certain SEI messages or may define specific handling of particular types of received SEI messages.

The following Table 1 lists the SEI messages specified in HEVC WD8 and briefly describes their purposes.

TABLE 1

Overview of SEI Messages

| SEI message | Purpose |
| --- | --- |
| Buffering period | Initial delays for hypothetical reference decoder (HRD) operation |
| Picture timing | Picture output time and picture/sub-picture removal time for HRD operation |
| Pan-scan rectangle | Displaying at a different picture aspect ratio (PAR) than the PAR of the output pictures |
| Filler payload | Adjusting the bitrate to meet specific constraints |
| User data registered | SEI messages to be specified by external entities |
| User data unregistered | |
| Recovery point | Additional information for clean random access. Gradual decoding refresh. |
| Scene information | Information about scene changes and transitions |
| Full-frame snapshot | Indication to label the associated decoded picture as a still-image snapshot of the video content |
| Progressive refinement segment | Indicates that certain consecutive pictures represent a progressive refinement of the quality of a picture rather than a moving scene |
| Film grain characteristics | Enables decoders to synthesize film grain |
| Deblocking filter display preference | Recommends whether or not displayed pictures should undergo the in-loop deblocking filter process |
| Post-filter hint | Provides suggested post-filter coefficients or correlation information for post-filter design |
| Tone mapping information | Remapping to another color space than that used or assumed in encoding |
| Frame packing arrangement | Packing of stereoscopic video into an HEVC bitstream |
| Display orientation | Specifies flipping and/or rotation that should be applied to the output pictures when they are displayed |
| Field indication | Provides information related to interlaced video content and/or field coding, e.g. indicates whether the picture is a progressive frame, a field, or a frame containing two interleaved fields |
| Decoded picture hash | Checksum of the decoded picture, which may be used for error detection |
| Sub-picture timing | Sub-picture removal time for HRD operation |
| Active parameter sets | Provides information on active VPS, SPS, etc. |
| Structure of Pictures description | Describes the temporal and inter prediction structure of the bitstream |

Among the SEI messages, the sub-picture picture SEI message may follow, in decoding order, the first VCL NAL unit in the access unit containing the SEI message, but in some examples, shall not follow, in decoding order, the last VCL NAL unit in the access unit. All of the other SEI messages may precede the first VCL NAL unit in the access unit when nuh_reserved_zero_6 bits is equal to 0 for the SEI NAL unit containing the SEI message.

In one example, an ROI, which is a subset of a picture, may be independently coded throughout a temporal duration, such that only the ROI can be transmitted, decoded and displayed as desired.

In another example, a video sequence may also be encoded in a way that random access from a non-intra picture is possible, and after a few pictures, the entire picture region can be correctly decoded at a position and afterwards in display/output order. This behavior is referred to as gradual decoding refresh (GDR). GDR provides both random accessibility and enhanced error resilience.

In HEVC WD8, there was no mechanism for signaling of regions of interest ROIs in HEVC. The recovery point SEI message in HEVC may be used to signal an GDR starting point and the corresponding recovery point. However, there is no way to signal which NAL units are needed if random access is performed at a GDR starting point. In some examples, this disclosure provides methods for enhanced signaling of ROIs. In other examples, this disclosure provides methods for enhanced signaling of GDR. Other examples in accordance with this disclosure may provide for methods for both enhanced signaling of ROIs and enhanced signaling of GDR.

In one example method, a flag is signaled, e.g., in the sequence parameter set (SPS), to indicate whether ISPs are enabled. Alternatively, the flag may be signaled in other places, e.g., the video parameter set (VPS) or the picture parameter set (PPS). The flag may be signaled by a video encoder in an encoded video bitstream. In turn, a decoder may receive such a flag in an encoded video bitstream, and use the flag to support ROI functions.

When enabled, the ISP identification (ISP ID) of each ISP is signaled, either in the slice header or in an SEI message. This signaling also enables association of slices to ISPs. A sequence-level SEI message is defined to carry the number of ISPs in the coded video sequence as well as the ISP's positions and sizes. These information items may also be signaled in the sequence parameter set, video parameter set or picture parameter set. Each ROI can be coded as an ISP. When a particular ISP corresponding to an ROI is the only region desired, slices not belonging to the ISP in each picture can be discarded, e.g., by a video decoder.

In another method, a flag is signaled, e.g., in the sequence parameter set, to indicate whether GDR is enabled. Alternatively, the flag may be signaled in other places, e.g., the video parameter set or the picture parameter set. The flag may be signaled by a video encoder in an encoded video bitstream. In turn, a decoder may receive such a flag in an encoded video bitstream, and use the flag to support GDR functions.

When enabled, whether a slice belongs to the foreground region in a picture is signaled, either in the slice header or in an SEI message. When random accessing from a GDR starting point, which is a non-RAP access unit containing a recovery point SEI message, the slices in all pictures from the starting point until the recovery point (but not including the recovery point) that do not belong to the foreground regions can be discarded.

The methods described above may be considered to be generic and can be applied to a variety of different types of video encoder-decoder (codec). Examples of detailed implementations of some of the methods are provided below.

An example implementation for a method for signaling of an independent sub-picture ID foreground flag in the slice header will now be described. Table 2 below provides an example of sequence parameter set raw byte sequence payload (RBSP) syntax for implementation of this method.

TABLE 2

| Sequence parameter set RBSP syntax | |
|---|---|
| seq_parameter_set_rbsp( ) { | Descriptor |
| ... | |
| independent_sub_picture_enabled_flag | u(1) |
| gradual_decoding_refresh_enabled_flag | u(1) |
| vui_parameters_present_flag | u(1) |
| if( vui_parameters_present_flag ) | |
| vui_parameters( ) | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

Semantics for syntax elements in Table 2 are as follows. The independent_sub_picture_enabled_flag syntax element equal to 1 specifies the presence of the isp_id syntax element (semantics described below) in slice headers of coded pictures in the coded video sequence. The independent_sub_picture_enabled_flag syntax element equal to 0 specifies the absence of the isp_id syntax element in slice headers of coded pictures in the coded video sequence.

The gradual_decoding_refresh_enabled_flag syntax element equal to 1 specifies the presence of the gdr_foreground_flag syntax element (semantics described below) in slice headers of coded pictures in the coded video sequence. gradual_decoding_refresh_enabled_flag equal to 0 specifies the absence of the gdr_foreground_flag syntax element in slice headers of coded pictures in the coded video sequence.

Table 3 below provides an example of slice header syntax elements for implementation of this method.

TABLE 3

| Slice header syntax | |
|---|---|
| slice_header( ) { | Descriptor |
| first_slice_in_pic_flag | u(1) |
| if( RapPicFlag ) | |
| no_output_of_prior_pics_flag | u(1) |
| pic_parameter_set_id | ue(v) |
| if( !first_slice_in_pic_flag ) | |
| slice_address | u(v) |
| if( dependent_slice_enabled_flag && | |
| !first_slice_in_pic_flag ) | |
| dependent_slice_flag | u(1) |
| if( !dependent_slice_flag ) { | |
| slice_type | ue(v) |
| if( independent_sub_picture_enabled_flag ) | |
| isp_id | ue(v) |
| if( gradual_decoding_refresh_enabled_flag ) | |
| gdr_foreground_flag | u(1) |
| ... | |
| } | |

Semantics for syntax elements in Table 3 are as follows. The isp_id syntax element specifies the identifier of the independent sub-picture to which the slice belongs. The value of isp_id may be in the range of 0 to 255, inclusive.

In an example, an independent sub-picture (ISP) identified by a particular value ispID includes and shall only include all slices with isp_id equal to ispID in the same picture. The region represented by an ISP may be a rectangular region. And, in some examples, regions repesented by different ISPs in a picture shall not overlap. In an example, ISP shall be independently decodable from other slices not in the ISP in the same picture, i.e., when a slice belongs to an ISP, and has dependent_slice_flag_equal 1, the previous slice, in decoding order, that has dependent_slice_flag_equal to 0 may belong to the same ISP. Hence, the ISP is decodable independently of, i.e., without reference to, any slices that are not in the ISP in the same picture.

Within a coded video sequence, when independent_sub_picture_enabled_flag is equal to 1, independent sub-pictures identified by a particualr isp_id from all the coded pictures are collectively referred to as an ISP sequence. An ISP sequence may be independently decodable from coded slices not belonging to the ISP sequence, i.e., in decoding of a slice in an ISP, no samples from a slice not belonging to the ISP sequence may be used in the inter prediction process. Hence, an ISP sequence is decodable independently of, i.e., without reference to, any coded slices that are not in the ISP sequence.

The gdr_foreground_flag syntax element equal to 1 indicates that the slice belongs to the forground region in the current picture. The gdr_foreground_flag syntax element equal to 0 indicates that the slice belongs to the background region in the current picture.

The foreground region in a picture includes and might only include all slices with gdr_foreground_flag equal to 1 in the picture, and other slices belong to the background region of the picture. The foreground region may be independently decodable from the background region in the same picture, i.e., when a slice belongs to the foreground region, and has dependent_slice_flag_equal 1, the previous slice, in decoding order, that has dependent_slice_flag_equal to 0 may also belong to the foreground region. Hence, the foreground region is decodable independently from the background region.

When gradual_decoding_refresh_enabled_flag is equal to 1 and the current picture is a random access point (RAP) picture. The presence of a recovery point SEI message associated with the current picture indicates all of the following: (a) the foreground region in the picture contains intra-coded coding blocks only, (b) the foreground regions in the set of pictures starting from the associated picture to the recovery point, inclusive, are independently decodable from coded slices that belong to coded pictures preceding the associated picture in decoding order or that belong to the background regions in the same set of pictures, and (c) all slices in the pictures following the recovery point in decoding order may be independently decodable from slices that belong to coded pictures preceding the associated picture in decoding order or that belong to the background regions in the same set of pictures. Accordingly, when gradual_decoding_refresh_enabled_flag is equal to 1 and the current picture is a random access point (RAP) picture, the decoder may independently decode coded slices that belong to coded pictures preceding the associated picture in decoding order or that belong to the background regions in the same set of pictures. The decoder may also independently decode slices that belong to coded pictures preceding the associated picture in decoding order or that belong to the background regions in the same set of pictures.

Syntax and semantics for independent sub-picture sequence information SEI messages will now be described with reference to Table 4 below.

TABLE 4

Independent sub-picture sequence information SEI message syntax

| isp_seq_info( payloadSize ) { | Descriptor |
|---|---|
| num_isps_minus1 | ue(v) |
| for( i = 0; i <= num_isps_minus1; i++ ) { | |
| isp_top_left[ i ] | ue(v) |
| isp_bottom_right[ i ] | ue(v) |
| } | |
| } | |

Semantics for syntax elements in Table 4 are described below. The independent sub-picture sequence information SEI message provides the number of ISPs in the coded video sequence containing the independent sub-picture sequence information SEI message as well as the ISPs positions and sizes.

num_isps_minus1 plus 1 specifies the number of ISPs in each picture in the coded video sequence containing the independent sub-picture sequence information SEI message. The value of num_isps_minus1 may be in the range of 0 to 255, inclusive.

isp_top_left[i] and isp_bottom_right[i] specify the top-left and bottom-right corners, respectively, of the ISP with isp_id equal to i in each picuture in the coded video sequence. top_left[i] and bottom_right[i] are coding tree block addresses in coding tree block raster scan of a picture. The ISP with top-left and bottom-right corners specified by top_left[i] and bottom_right[i], respectively, may be inside pictures in the coded video sequence and may not overlap with any other ISP.

An example implementation for a method for signaling of independent sub-picture ID foreground flag in SEI messages will now be described. Table 5 below provides an example of sequence parameter set raw byte sequence payload (RBSP) syntax for implementation of this method. Table 5 for this example of signaling of independent sub-picture ID foreground flag in SEI messages is the same as Table 2 above in the example of signaling of an independent sub-picture ID foreground flag in the slice header described above.

TABLE 5

Sequence parameter set RBSP syntax

| seq_parameter_set_rbsp( ) { | Descriptor |
|---|---|
| ... | |
| independent_sub_picture_enabled_flag | u(1) |
| gradual_decoding_refresh_enabled_flag | u(1) |
| vui_parameters_present_flag | u(1) |
| if( vui_parameters_present_flag ) | |
| vui_parameters( ) | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

Semantics for syntax elements in Table 5 are described below. The independent_sub_picture_enabled_flag syntax element equal to 1 specifies the presence of the isp_id syntax element in ISP and GDR information SEI messages in the coded video sequence. The independent_sub_picture_enabled_flag sytnax element equal to 0 specifies the absence of the isp_id syntax element in ISP and GDR information SEI messages in the coded video sequence.

The gradual_decoding_refresh_enabled_flag equal to 1 specifies, to the decoder, the presence of the gdr_foreground_flag syntax element ISP and GDR information SEI messages in the coded video sequence. gradual_decoding_refresh_enabled_flag equal to 0 specifies, to the decoder, the absence of the gdr_foreground_flag syntax element ISP and GDR information SEI messages in the coded video sequence.

The independent sub-picture sequence information SEI message syntax and semantics for the method of signaling of independent sub-picture ID foreground flag in SEI messages can be the same or substantially the same as described above with respect to the method for signaling of independent sub-picture ID foreground flag in SEI messages. In particular, the syntax and semantics described with reference to Table 4 are repeated below.

TABLE 6

Independent sub-picture sequence information SEI message syntax

| isp_seq_info( payloadSize ) { | Descriptor |
|---|---|
| num_isps_minus1 | ue(v) |
| for( i = 0; i <= num_isps_minus1; i++ ) { | |
| isp_top_left[ i ] | ue(v) |
| isp_bottom_right[ i ] | ue(v) |
| } | |
| } | |

Semantics for syntax elements in Table 6 are described below.

The independent sub-picture sequence information SEI message provides the number of ISPs in the coded video sequence containing the independent sub-picture sequence information SEI message as well as the ISPs positions and sizes.

num_isps_minus1 plus 1 specifies the number of ISPs in each picture in the coded video sequence containing the independent sub-picture sequence information SEI message. The value of num_isps_minus1 may be in the range of 0 to 255, inclusive.

isp_top_left[i] and isp_bottom_right[i] specify the top-left and bottom-right corners, respectively, of the ISP with isp_id equal to i in each picuture in the coded video sequence. top_left[i] and bottom_right[i] are coding tree block addresses in coding tree block raster scan of a picture. The ISP with top-left and bottom-right corners specified by top_left[i] and bottom_right[i], respectively, may be inside pictures in the coded video sequence and might not overlap with any other ISP.

Syntax and semantics for independent sub-picture and GDR information SEI message will now be described with reference to Table 7 below.

TABLE 7

Independent sub-picture and gradual decoding refresh information SEI message syntax

| isp_gdr_info( payloadSize ) { | Descriptor |
|---|---|
| if( independent_sub_picture_enabled_flag ) | |
| isp_id | ue(v) |
| if( gradual_decoding_refresh_enabled_flag ) | |
| gdr_foreground_flag | u(1) |
| } | |

The ISP and GDR information SEI message provides the identifier of the ISP that contains the slices to which the current SEI message applies, and/or whether the slices to which the current SEI message applies belongs to the foreground region of the current picture, for which the access unit contains the current SEI message.

If the ISP and GDR information SEI message is not the last ISP and GDR information SEI message in the access unit, the slices to which the SEI message applies consists, in decoding order, of all slices that follow the SEI NAL unit containing the SEI message in decoding order and precede the next SEI NAL unit containing an ISP and GDR information SEI message in decoding order. Otherwise, the slices to which an ISP and GDR information SEI message applies consists of all slices that succeed the SEI NAL unit containing the SEI message in decoding order.

The slices that an ISP and GDR information SEI message applies to are also referred to as the slices associated with the ISP and GDR information SEI message.

The isp_id syntax element specifies the identifier of the independent sub-picture to which the slices associated with the current SEI message belong. The value of isp_id may be in the range of 0 to 255, inclusive.

An ISP identified by a particular value ispID includes and might only include all slices associated with ISP and GDR information SEI messages having isp_id equal to ispID in the same picture. The region represented by an ISP may be a rectangular region. And, regions repesented by different ISPs in a picture might not overlap. An ISP may be independently decodable from other slices not in the ISP in the same picture, i.e., when a slice belongs to an ISP, and has dependent_slice_flag equal 1, the previous slice, in decoding order, that has dependent_slice_flag equal to 0 may belong to the same ISP. Hence, the ISP is decodable independently of, i.e., without reference to, slices that are not in the ISP in the same picture.

Within a coded video sequence, when independent_sub_picture_enabled_flag is equal to 1, independent sub-pictures identified by a particualr isp_id from all the coded pictures are collectively referred to as an ISP sequence. An ISP sequence may be independently decodable from coded slices not belonging to the ISP sequence, i.e., in decoding of a slice in an ISP, no samples from a slice not belonging to the ISP sequence may be used in the inter prediction process.

The gdr_foreground_flag syntax element equal to 1 indicates that the slices associated with the current SEI message belong to the foreground region in the current picture. gdr_foreground_flag equal to 0 indicates that the slices associated with the current SEI message belong to the background region in the current picture.

The forground region in a picture includes and might only include all slices associated with ISP and GDR information SEI messages having gdr_foreground_flag equal to 1 in the picture, and other slices belong to the background region of the picture. The foreground region may be independently decodable from the background region in the same picture, i.e., when a slice belongs to the foreground region, and has dependent_slice_flag equal 1, the previous slice, in decoding order, that has dependent_slice_flag equal to 0 may also belong to the foreground region. Hence, the foreground region may be decodable independently of, i.e., without reference to, the background region in the same picture.

When gradual_decoding_refresh_enabled_flag is equal to 1 and the current picture is a RAP picture, the presence of a recovery point SEI message associated with the current picture indicates all of the following: (a) the foreground region in the picture contains intra-coded coding blocks only, (b) the foreground regions in the set of pictures starting from the associated picture to the recovery point, inclusive, are independently decodable from coded slices that belong to coded pictures preceding the associated picture in decoding order or that belong to the background regions in the same set of pictures, and (c) all slices in the pictures following the recovery point in decoding order may be independently decodable from slices that belong to coded pictures preceding the associated picture in decoding order or that belong to the background regions in the same set of pictures.

Using the techniques described above, an encoder may encode video data corresponding to an ROI, e.g., within slices associated with one or more ISPs or within slices designated as belonging to a foreground region, and signal information, such as the syntax elements described in this disclosure, to permit a decoder to extract and decode such ROI video data. For example, the video decoder may parse and decode the bitstream to obtain signaling information, such as the syntax elements described in this disclosure, decode selected slices associated with the ROI, e.g., where such slices may be identified based on ISPs or foreground region designations, as described herein. In some examples, using the information, the decoder might not decode selected slices that are not part of an ROI, e.g., where such slices do not belong to particular ISPs or do not belong to foreground regions. Instead, the decoder may discard such slices.

The methods described in this disclosure may be performed by a video encoder or video decoder, such as the video encoder 20 or video decoder 30 described with reference to the examples of FIGS. 1-3. Using the syntax elements described above, in one example, a decoder may use ISP information or GDR foreground information to identify slices that carry ROI video data, and selectively decode ROI information, either as ISPs or in the course of a GDR process, as described herein.

As described in this disclosure, in one example, a video encoder 20 or video decoder 30 may be configured to perform a method of coding video data, the method comprising coding information indicating whether ISPs are enabled, when independent sub-pictures are enabled, coding information indicating an ISP ID for one of the ISPs, and coding video data corresponding to an ROI as one of the ISPs.

Coding information to indicate whether ISPs are enabled may comprise coding the information in one of a sequence parameter set, video parameter set or picture parameter set to indicate whether ISPs are enabled. In some examples, this information may indicate that ISPs are enabled for all pictures in sequence, all pictures in a layer of a sequence, or individual pictures. Coding information indicating ISP IDs for each of one or more ISPs may comprise coding the information in a slice header or a supplemental enhancement information (SEI) message to indicate ISP IDs for each of one or more ISPs.

One or more video data slices may be associated with the ISPs. For example, a given slice may be associated with a given ISP. In some examples, ISP characteristics including a number of the ISPs, positions of the ISPs and sizes of the ISPs in a coded video sequence may be coded. The ISP characteristics may be coded, for example, in an SEI message. In some examples, the ISP characteristics may be coded in one of a sequence parameter set, video parameter set, or picture parameter set.

As used herein, the term "coding" may refer to encoding or decoding, as applicable in a given context, and may refer to either in a generic sense in many cases, particularly in light of the reciprocal nature of some aspects of the video encoding and decoding processors. Accordingly, coding may refer to encoding with a video encoder 20, or decoding with a video decoder 30.

In the case of decoding, a decoder may receive information in an encoded video bitstream, decoding the information, and decode video data using the information. For example, a video decoder may decode slices that belong to the ISPs and not decode (e.g., discard) slices that do not belong to the ISPs. The decoder may generate video data corresponding to the ROI based on the decoded slices that belong to the ISPs.

As described in this disclosure, in another example, a video encoder 20 or video decoder 30 may be configured to perform a method of coding video data, the method comprising coding information indicating whether GDR of pictures is enabled, and when GDR is enabled, coding information indicating whether slices belong to a foreground region of a picture.

In one example, the method may comprise coding information indicating pictures corresponding to GDR starting point and a GDR recovery point. In another example, the method may comprise coding video data corresponding to an ROI in the slices belonging to the foreground regions. As a further example, the method may comprise coding video data corresponding to an ROI in the slices belonging to the foreground regions between the GDR starting point and the GDR recovery point.

Coding information to indicate whether GDR is enabled may comprise coding the information in one of a sequence parameter set, video parameter set or picture parameter set to indicate whether GDR is enabled. In some examples, this information may indicate whether GDR is enabled for all pictures in sequence, all pictures in a layer of a sequence, or individual pictures. Coding information indicating whether a slice belongs to a foreground region of a picture may comprise coding the information in a slice header or an SEI message to indicate whether the slice belongs to the foreground region of the picture.

Again, this method may be performed, in some examples, by a video encoder 20 or by a video decoder 30. In the case of decoding, the method may further comprise receiving the information indicating whether slices of the pictures belong to a foreground region of the respective picture in an encoded video bitstream, decoding the information, and decoding video data using the information. In addition, the method may comprise decoding slices that belong to the foreground region, and discarding slices that do not belong to the foreground region, and generating video data corresponding to the ROI based on the decoded slices that belong to the foreground region. As a further example, the method may comprise performing random access from a GDR starting point, decoding slices in pictures from the GDR starting point to a GDR recovery point that belong to the foreground region, and discarding slices in pictures from the GDR starting point to the GDR recovery point that do not belong to the foreground region.

FIG. 1 is a block diagram illustrating an example video encoding and decoding system 10 that may utilize techniques for signaling and/or receiving information relating to ROIs, information relating to GDR, or both. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to perform techniques for signaling information relating to ROIs, information relating to GDR, or both. For example, video encoder 20 may be configured to encode signaling information in an encoded video bitstream to provide a video decoder, such as video decoder 30, with information relating to ROIs, information relating to GDR, or both for use in a video decoding process. Video decoder 30 may be configured to decode and parse a bitstream to obtain signaling information relating to ROIs, information relating to GDR, or both and use such information in a video decoding process. In other examples, a source device and a destination device may include other components or arrangements. For example, video source 18 may be an external video source such that source device 12 may receive video data from an external video source, such as an external camera. Likewise, destination device 14 may interface with an external display device, rather than including an integrated display device.

In accordance with this disclosure, systems, methods, or apparatus for coding video data may, in one example, code information indicating whether GDR of pictures is enabled. In some examples, when GDR is enabled, the processor or processors may code information indicating whether slices belong to a foreground region of a picture. For example, a system or apparatus for coding video data may include a processor or processors configured to perform one or more steps of the method. Such a processor or processors may be part of video encoder 20 or video decoder 30 in some examples.

In accordance with this disclosure, systems, methods, or apparatus for coding video data may, in another example, code information indicating whether one or more ISPs are enabled. When independent sub-pictures are enabled, these systems, methods, or apparatus may code information indicating an ISP ID for one of the ISPs and code video data corresponding to an ROI as one of the ISPs. As described herein, some examples may code both information indicating whether GDR of pictures is enabled and whether one or more ISPs are enabled.

In accordance with this disclosure, in some examples, coding may comprise encoding and an apparatus implementing one or more of the methods described herein may be configured to encode with video encoder 20. In another example, video encoder may be an apparatus implementing one or more of the methods described herein. In accordance with this disclosure, in some examples, coding may comprise decoding and an apparatus implementing one or more of the methods described herein may be configured to decode with video decoder 30. In another example, encoder 20 may be an apparatus implementing one or more of the methods described herein.

The illustrated system 10 of FIG. 1 is merely one example. Techniques for signaling and/or receiving information relating to ROIs, GDR, or both may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor.

Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. The upcoming HEVC standard also refers to LCUs as "coding tree units." Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the uncoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
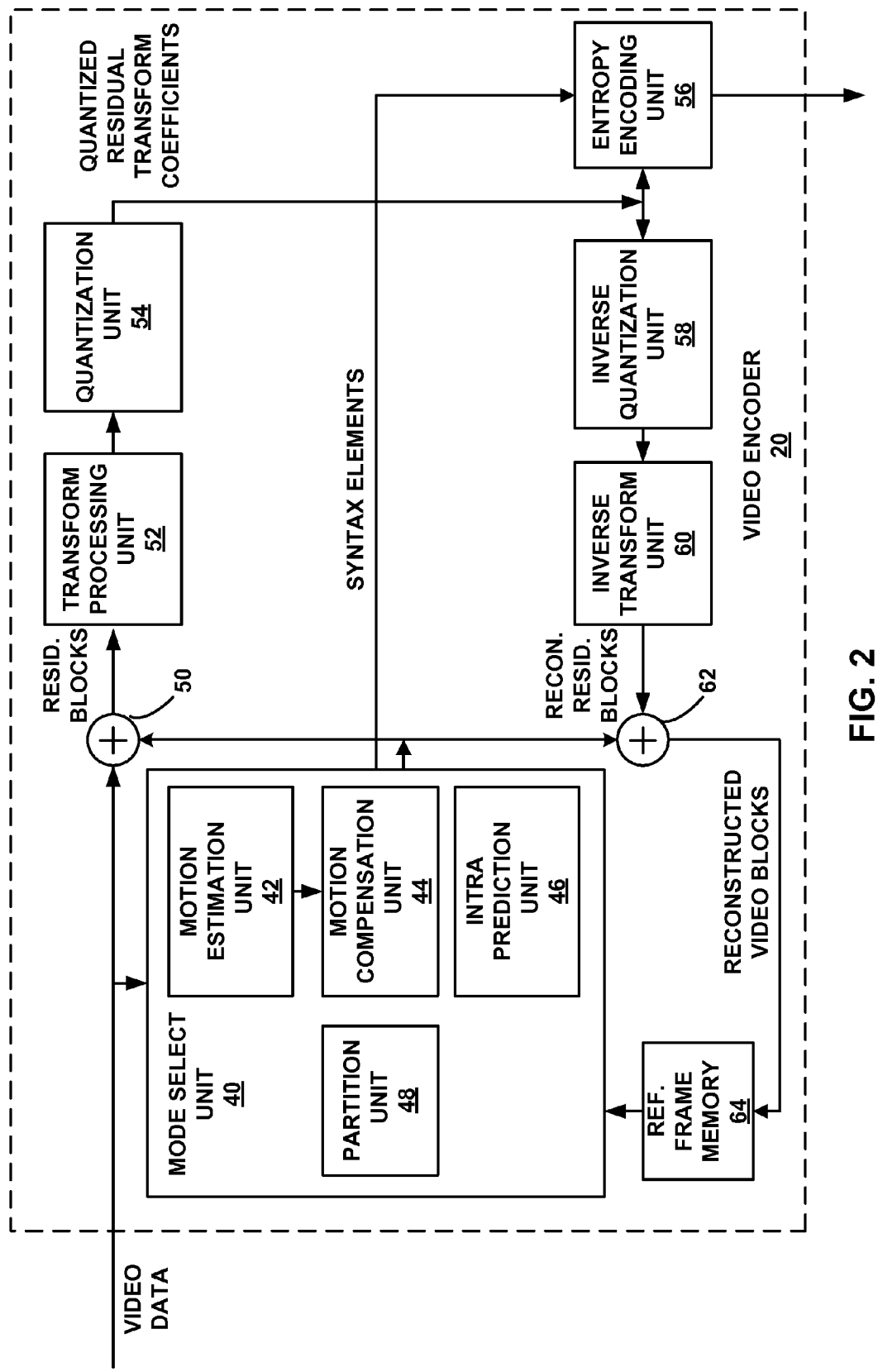
FIG. 2 is a block diagram illustrating an example of a video encoder that may utilize techniques for signaling ROIs. GDRs, or both as described in this disclosure.

FIG. 2 is a block diagram illustrating an example of video encoder 20 that may implement techniques for signaling information indicating of ROIs, information indicating of GDR, or both. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data. The configuration data may include a plurality of intra-prediction mode index tables and a plurality of modified intra-prediction mode index tables (also referred to as codeword mapping tables). The configuration data may also include definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms, which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Video encoder 20 of FIG. 2 represents an example of a video encoder configured to perform various methods described in this disclosure. In accordance with the methods described in this disclosure, video encoder 20 may use the syntax elements described herein. Video encoder 20 may use ISP information or GDR foreground information to identify slices that carry ROI or foreground region video data, and selectively decode ROI or foreground region information, either as ISPs or in the course of GDR process, as described herein.

In one example, video encoder 20 may be configured to perform a method of coding video data. The method may include coding information indicating whether ISPs are enabled. When independent sub-pictures are enabled, video encoder 20 may code information indicating an ISP ID for one of the ISPs. Video encoder 20 may also code video data corresponding to an ROI as one of the ISPs.

Encoding information to indicate whether ISPs are enabled may include encoding the information in one of a sequence parameter set, video parameter set or picture parameter set to indicate whether ISPs are enabled. In some examples, this information may indicate that ISPs are enabled for all pictures in sequence, all pictures in a layer of a sequence, or individual pictures. Encoding information indicating ISP ISP IDs for each of one or more ISPs may comprise coding the information in a slice header or an SEI message to indicate ISP IDs for each of one or more ISPs.

As described in this disclosure, in another example, video encoder 20 may be configured to perform a method of coding video data, the method comprising coding information indicating whether GDR of pictures is enabled, and when GDR is enabled, coding information indicating whether slices belong to a foreground region of a picture.

The method may include encoding information indicating pictures corresponding to GDR starting point and a GDR recovery point. In some examples, the method may comprise coding video data corresponding to the slices belonging to the foreground regions. As a further example, the method may comprise coding video data corresponding to the slices belonging to the foreground regions between the GDR starting point and the GDR recovery point.

Encoding information to indicate whether GDR is enabled may comprise coding the information in one of a sequence parameter set, video parameter set or picture parameter set to indicate whether GDR is enabled. In some examples, this information may indicate whether GDR is enabled for all pictures in sequence, all pictures in a layer of a sequence, or individual pictures. Encoding information indicating whether a slice belongs to a foreground region of a picture may comprise coding the information in a slice header or an SEI message to indicate whether the slice belongs to the foreground region of the picture. In some examples, an SEI message may indicate whether slices are foreground or background. In an example, all slices after an SEI message indicating foreground are foreground until a later SEI message indicating that the following slices are background is received. In another implementation example, a system or method may use an SEI message as an indicator for every slice or for a predetermined number of slices.

In an example method of encoding video data, video encoder 20 may encode information indicating whether GDR of pictures is enabled. For example, this may be performed by entropy encoding unit 56. Additionally, when GDR is enabled, entropy encoding unit 56 of video encoder 20 may encode information indicating whether slices belong to a foreground region of a picture. In other examples, other systems or subsystems of video encoder 20 may perform one or more aspects of the methods described herein.

In some examples, entropy encoding unit 56 or some other processing unit of video encoder 20 may encode information indicating pictures corresponding to a GDR starting point and a GDR recovery point. Entropy encoding unit 56 may encode video data corresponding to an ROI in the slices belonging to the foreground regions. In one example, entropy encoding unit 56 may encode this information in a first slice of a set of slices belonging to the foreground regions between the GDR starting point and the GDR recovery point. Accordingly, a flag or SEI message may indicate the start of a series of slices in a foreground region or a background region.

The information may, for example, be indicated by an SEI message, a flag or syntax element in a slice header, or in any a parameter set or picture delimiter. Examples that use an SEI message to indicate whether the slice belongs to the foreground region of the picture may send one SEI message per slice or an SEI message could apply to a series of slices. In some examples, a predetermined number of slices may be indicated by the SEI message. In another example, an SEI message could apply to a series of slices until the next SEI message is received. A flag in a slice header might have similar functionality. The flag may be sent once for each slice or the flag could apply to a series of slices or a known number of slices.

In another example, an entropy encoding unit 56 may encode this information in slices belonging to the foreground regions between the GDR starting point and the GDR recovery point. Accordingly, some examples may set a foreground flag in each slice to indicate whether it is in a foreground region or a background region. A foreground region may also be referred to as a refreshed region, and a background region (a region that is not a foreground region) may also be referred to as a non-refreshed region. In some examples, encoding information to indicate whether GDR is enabled may include encoding the information in one of a sequence parameter set, video parameter set or picture parameter set to indicate whether GDR is enabled. The information may include a flag or SEI message, for example, and may indicate that GDR is enabled for the entire sequence.

In some examples, encoding information indicating whether a slice belongs to a foreground region of a picture may include encoding the information in a slice header or an SEI message to indicate whether the slice belongs to the foreground region of the picture. For example, a flag in the slice header or foreground SEI message may indicate that all slices following the flag or SEI message are foreground until the next SEI message is received indicating background. In other examples, flags in slices or flags in SEI messages may indicate some predetermined number of foreground slices. In an example using flags in slices every slice may have a flag rather than using a single flag in a single slice to indicate foreground or background for multiple slices. In some examples, entropy encoding unit 56 of video encoder 20 may encode information indicating whether one or more ISPs are enabled. When independent sub-pictures are enabled, entropy encoding unit 56 may encode information indicating an ISP ID for one of the ISPs and encode video data corresponding to an ROI as one of the ISPs. Encoding information to indicate whether ISPs are enabled may include encoding the information in one of a sequence parameter set, video parameter set or picture parameter set to indicate whether ISPs are enabled. Additionally, encoding information indicating ISP IDs for each of one or more ISPs comprises encoding the information in a slice header or an SEI message to indicate ISP IDs for each of one or more ISPs. In some examples, video encoder 20 may associate one or more video data slices with the ISPs. Additionally, entropy encoding unit 56 may encode ISP characteristics including a number of the ISPs, positions of the ISPs and sizes of the ISPs in a coded video sequence, encode the ISP characteristics in an SEI message, or encode the ISP characteristics in one of a sequence parameter set, video parameter set, or picture parameter set.

Figure 3:
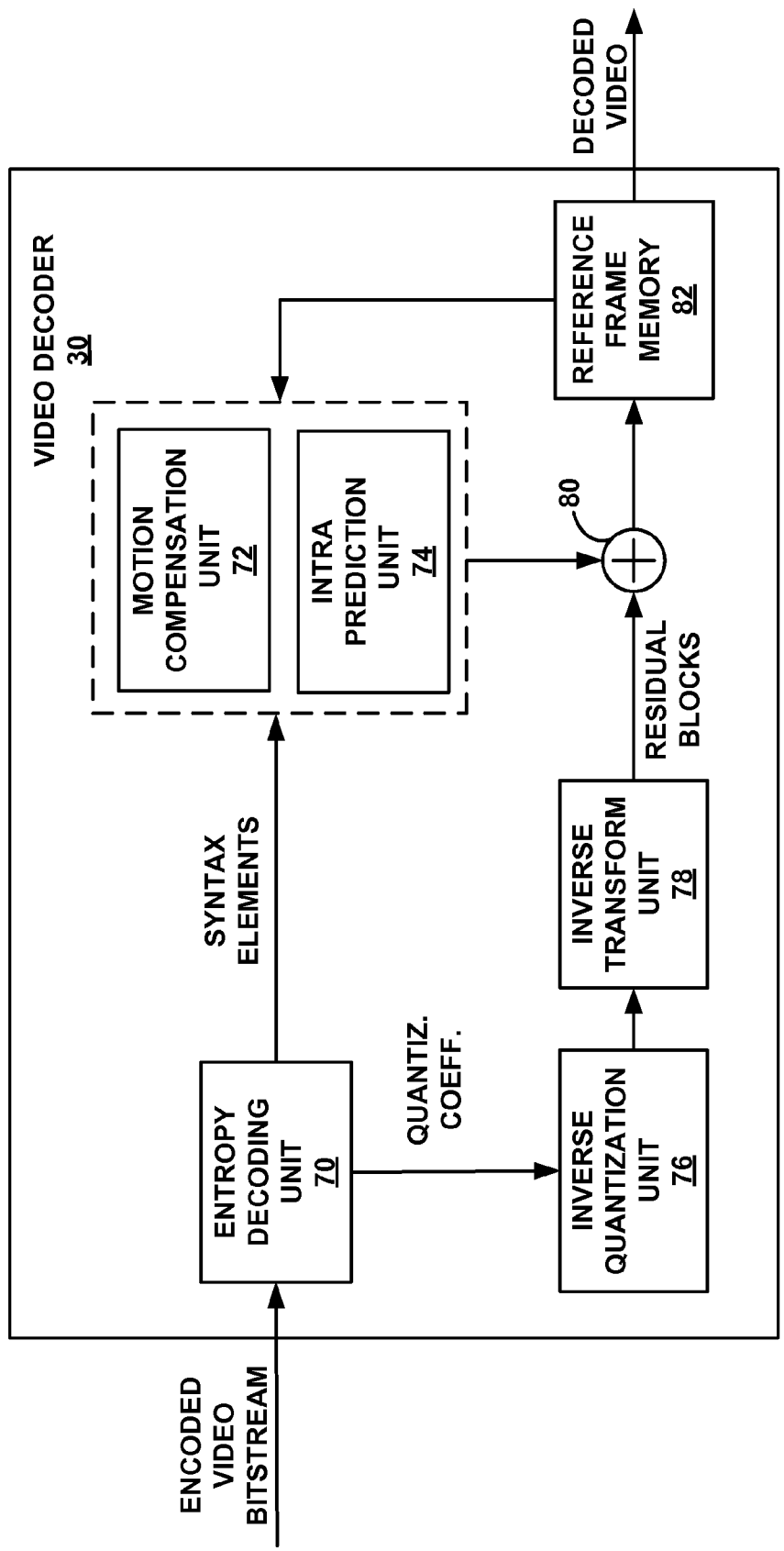
FIG. 3 is a block diagram illustrating an example of a video decoder that may utilize techniques for signaling ROIs, GDRs, or both as described in this disclosure.

FIG. 3 is a block diagram illustrating an example of video decoder 30 that may implement techniques for processing information indicating of ROIs, information indicating of GDR foreground region, or both. In the example of FIG. 3, video decoder 30 includes an entropy decoding unit 70, motion compensation unit 72, intra-prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference frame memory 82, which stores reference pictures used for subsequent motion compensation. Reference frame memory 82 also stores decoded video for later presentation on a display device, such as display device 32 of FIG. 1.

Video decoder 30 of FIG. 3 represents an example of a video decoder configured to perform various methods described in this disclosure. The methods described in this disclosure may be performed by video decoder 30. For example, entropy decoding unit 70, which may be within video decoder 30 may perform one or more aspects described in this disclosure. For example, using the syntax elements described above, a video decoder 30 may use ISP information or GDR foreground region information to identify slices that carry ROI or GDR foreground region video data, and selectively decode ROI or GDR foreground region information, either as ISPs or GDR foreground region, as described herein. As described in this disclosure, in one example, video decoder 30 may be configured to perform a method of coding video data. The method may include decoding information indicating whether ISPs are enabled. In other words, the information may indicate when ISPs are present and processing of only the regions covered by ISPs are possible. When independent sub-pictures are enabled, the method may include coding information indicating an ISP ID for one of the ISPs, and decoding video data corresponding to an ROI as one of the ISPs. Some or all of the decoding, e.g., possibly of ROI or GDR syntax elements may occur within entropy decoding unit 70. Generally, however, the decoding may occur in another processing unit of video decoder 30 such as, for example, intra-prediction unit 74 or other processing unit.

Decoding information to indicate whether ISPs are enabled may include decoding the information in one of a sequence parameter set, video parameter set or picture parameter set to indicate whether ISPs are enabled. In some examples, this information may indicate that ISPs are enabled for all pictures in sequence, all pictures in a layer of a sequence, or individual pictures. For example, in some cases ISPs may not be used. In other cases, ISPs may be used in all pictures in a sequence, all pictures in a layer of a sequence, or for individual pictures. Decoding information indicating ISP IDs for each of one or more ISPs may comprise decoding the information in a slice header or an SEI message to indicate ISP IDs for each of one or more ISPs. In this way, the ISP ID of each ISP may be signaled, e.g., either in the slice header or in an SEI message. This signaling also may enable association of slices to ISPs. Additionally, when a particular ISP corresponding to an ROI is the only region desired, slices not belonging to the ISP in each picture can be discarded, which slices belonging to the ISP may be decoded and processed as ROI video data.

As described in this disclosure, in another example, video decoder 30, e.g., entropy decoding unit 70 or other portions of video decoder 30, may be configured to perform a method of decoding video data. The method may include decoding information indicating whether GDR of pictures is enabled, and when GDR is enabled, decoding information indicating whether slices belong to a foreground region or a background region of a picture. A foreground region may also be referred to as a refreshed region, and a background region (a region that is not a foreground region) may also be referred to as a non-refreshed region. When random accessing from a GDR starting point, which is a non-RAP access unit containing a recovery point SEI message, the slices in all pictures from the starting point until the recovery point (but not including the recovery point) that do not belong to the foreground regions may be discarded.

In some examples, video decoder 30 may be configured to perform a method of decoding video data including decoding information indicating pictures corresponding to GDR starting point and a GDR recovery point. The method may include decoding video data corresponding to the slices belonging to the foreground regions. As a further example, the method may include decoding video data corresponding to the slices belonging to the foreground regions between the GDR starting point and the GDR recovery point.

Decoding information to indicate whether GDR is enabled may include decoding the information in one of a sequence parameter set, video parameter set or picture parameter set to indicate whether GDR is enabled. In some examples, this information may indicate whether GDR is enabled for all pictures in a sequence (also referred to as a coded video sequence), all pictures in a layer of a sequence, or individual pictures in a sequence. Decoding information indicating whether a slice belongs to a foreground region of a picture may comprise decoding the information in a slice header, e.g., a flag indicating that the particular slice is foreground or background, or an SEI message to indicate whether a slice associated with the SEI message belongs to the foreground region of the picture. Examples that use an SEI message to indicate whether the slice belongs to the foreground region of the picture may send one SEI message per slice or an SEI message could apply to a series of slices. In some examples, a predetermined number of slices may be indicated. In another example, an SEI message could apply to a series of slices until the next SEI message is received. Hence, there may be multiple slices between successive SEI messages.

Again, this method may be performed, in some examples, by a video decoder 30. In the decoding case, the method may further include receiving the information indicating whether slices of the pictures belong to a foreground region of the respective picture in an encoded video bitstream, decoding the information indicating whether slices of the pictures belong to a foreground region of the respective picture, and decoding video data using the information. In addition, the method may include decoding slices that belong to the foreground region, e.g., as indicated by an SEI message or a flag or syntax element in a slice header and discarding slices that do not belong to the foreground region, and generating video data corresponding to the foreground region based on the decoded slices that belong to the foreground region. As a further example, the method implemented by video decoder 30 may include performing random access from a GDR starting point, decoding slices in pictures from the GDR starting point to a GDR recovery point that belong to the foreground region, and discarding slices in pictures from the GDR starting point to the GDR recovery point that do not belong to the foreground region.

As described in this disclosure, in one example, systems, apparatus, and methods of decoding video data may include decoding information indicating whether GDR of pictures is enabled. When GDR is enabled, these systems, apparatus, and methods may decode information indicating whether slices belong to a foreground region of a picture. Such systems, apparatus, and methods may further include decoding information indicating pictures corresponding to GDR starting point and a GDR recovery point.

In some examples, video decoder 30 may decode video data corresponding to the slices belonging to the foreground regions between the GDR starting point and the GDR recovery point, as indicated by the recovery point SEI message. Decoding information to indicate whether GDR is enabled may include decoding the information indicating whether slices of the pictures belong to a foreground region of the respective picture in one of a sequence parameter set, video parameter set or picture parameter set to indicate whether GDR is enabled in some examples. Decoding information indicating whether a slice belongs to a foreground region of a picture may include decoding the information in a slice header or an SEI message to indicate whether the slice belongs to the foreground region of the picture in some examples. The information may, for example, be indicated by an SEI message or a flag or syntax element in a slice header. Entropy decoding unit 70 may perform some or all of the decoding described with respect to FIG. 3.

In an example video decoder 30, e.g., entropy decoding unit 70 may receive information in an encoded video bitstream. Entropy decoding unit 70 may decode the information and decode video data using the information. Video decoder 30 may further decode slices that belong to the foreground region and discarding slices that do not belong to the foreground region. In some examples, video decoder 30 may generate video data corresponding to the foreground region based on the decoded slices that belong to the foreground region. Video decoder 30 may also perform random access from a GDR starting point, decode slices in pictures from the GDR starting point to a GDR recovery point that belong to the foreground region, and discard slices in pictures from the GDR starting point to the GDR recovery point that do not belong to the foreground region. In some examples, this range may be between the starting point and recovery point. In other examples, this range may be between the starting point and recovery point and inclusive of one, the other, or both. Generally, in one implementation, when random accessing from a GDR starting point, which is a non-RAP access unit containing a recovery point SEI message, the slices in all pictures from the starting point until the recovery point (but not including the recovery point) that do not belong to the foreground regions may be discarded.

Figure 4:
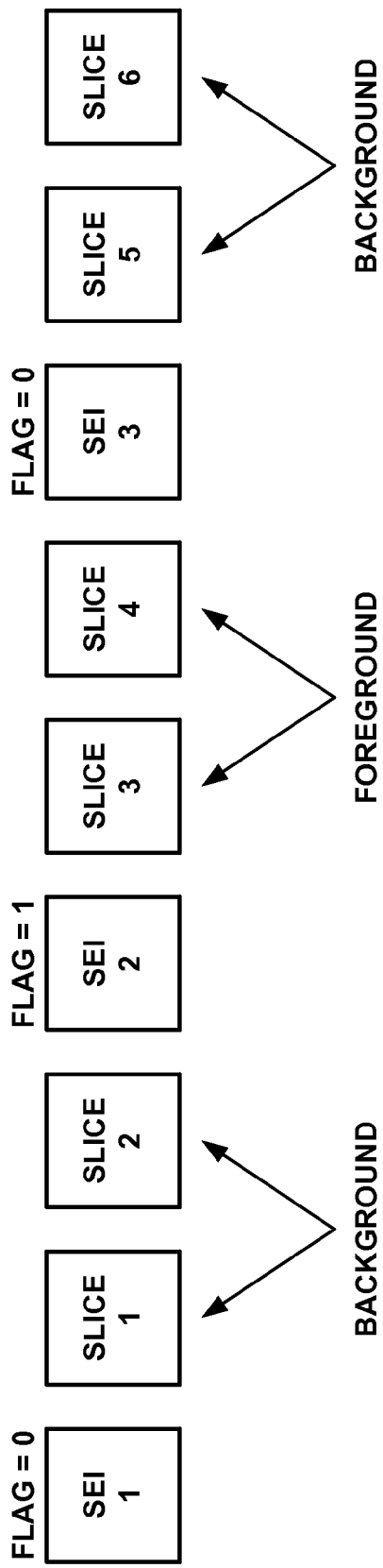
FIG. 4 is a block diagram an example series of supplemental enhancement information (SEI) messages that utilize techniques described in this disclosure to indicate background and foreground regions.

FIG. 4 is a block diagram an example series of SEI messages that utilize techniques described in this disclosure. As described herein, an SEI message or a syntax element in a slice header may be used to indicate whether a slice is foreground or background for purposes of GDR process or to indicate the ISP ID of the slice for ROI processing. In the illustrated example of FIG. 4 an SEI message may include a syntax element indicating that all slices following the SEI message are foreground slices for GDR purposes or indicating the ISP ID of all slices following the SEI message for ROI purposes, until a next SEI message is received. After the next SEI message is received, the background or foreground status or the ISP ID of the slices that follow the next SEI message may be determined based on an indication in the next SEI message. For examples, in FIG. 4, a first SEI message (SEI 1) indicates that slices (Slices 1 and 2) following the first SEI message are slices that belong to a background region. In the illustrated example of FIG. 4, SEI 1 indicates this using a flag in the SEI message that is equal to "0." It will be understood, however, that a flag equaling "1" might be used to provide such an indication.

A second SEI message (SEI 2) indicates that slices (Slices 3 and 4) following the second SEI message are slices that belong to a foreground region. In the illustrated example of FIG. 4, SEI 2 indicates this using a flag that is equal to "1." Again, it will be understood, however, that a flag equaling "0" might be used to provide such an indication.

A third SEI message (SEI 3) indicates that slices (Slices 5 and 6) following the third SEI message are slices that belong to a background region. In the illustrated example of FIG. 4, SEI 3 indicates this using a flag that is equal to "0." Again, it will be understood, however, that a flag equaling "1" might be used to provide such an indication. Hence, slices that follow SEI 1 are background until another SEI message (SEI 2) is received, which indicates that slices following SEI 2 are foreground slices. SEI 3 indicates that slices following SEI 3 are background slices. Accordingly, slices between SEI 2 and SEI 3 are foreground slices. Although two slices are shown between each SEI message, any number of slices could be provided between SEI messages. The slices following a particular SEI message will have the foreground or background status indicated by the SEI message. The foreground or background status will remain the same for slices following the SEI message until the next SEI message is received, at which point slices following the next SEI message will have foreground or background status as specified by that next SEI message.

Accordingly, to summarize, in the illustrated example of FIG. 4, a flag in the slice header or foreground SEI message may indicate that all slices following the flag or SEI message are either background slices if the SEI message indicates that the slices are background, e.g., the flag equals "0," or foreground slices if the SEI message indicates that the slices are foreground, e.g., the flag equals "1." As illustrated in FIG. 4, the flag in the SEI message may be used as the indicator of foreground or background until the next SEI message including such an indication. In the illustrated example of FIG. 4, a flag that is equal to "0" indicates background and a flag that is equal to "1" indicates foreground. It will be understood, however, that the converse may also be used. In other words, a flag that is equal to "1" may be used to indicate background and a flag that is equal to "0" may indicate foreground.

Figure 5:
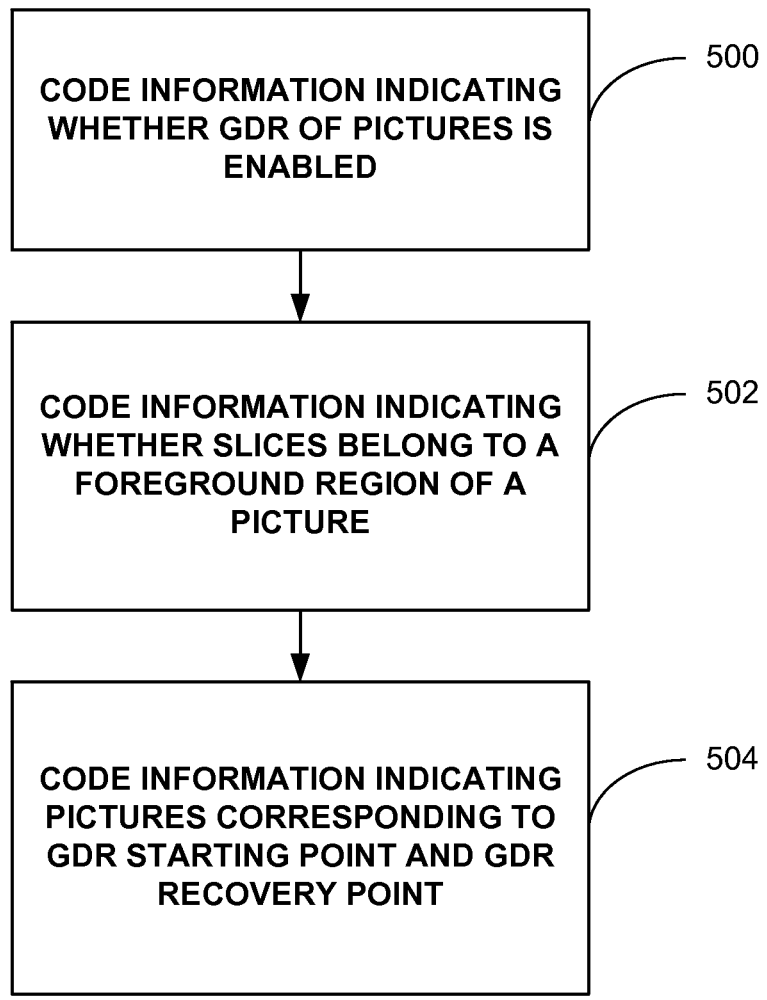
FIG. 5 is a flow diagram illustrating an example method related to GDR and implementing one or more aspects of this disclosure.
Figure 6:
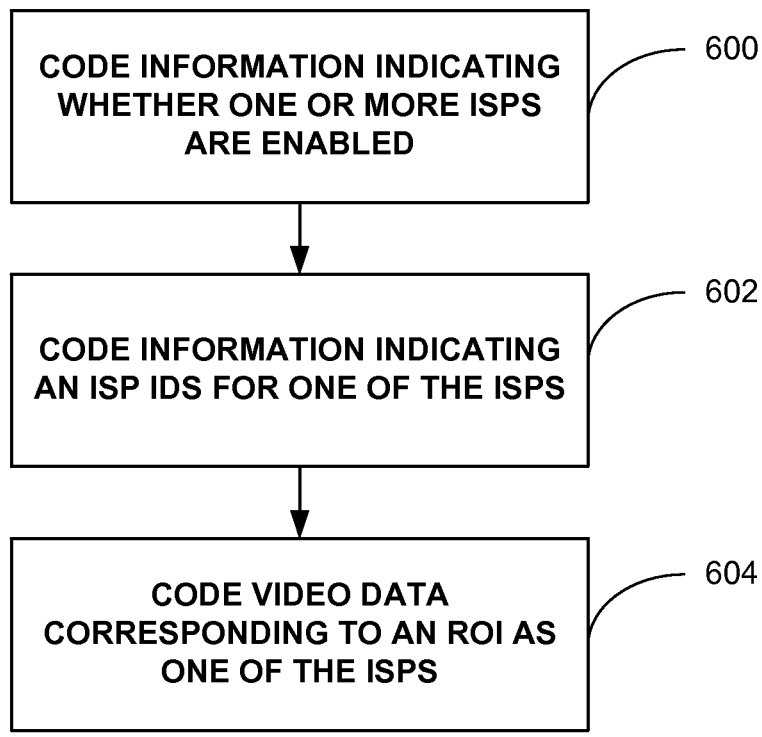
FIG. 6 is a flow diagram illustrating an example method related to ROI and implementing one or more aspects of this disclosure.

FIGS. 5 and 6 are flow diagrams illustrating example methods implementing one or more aspects of this disclosure. As described herein some example implementations may signal information related to GDR. Other example implementations may signal information related to ROIs. FIG. 5 relates to GDR aspects of this disclosure, while FIG. 6 relates to ROI aspects of this disclosure. Additionally, as described herein, some example implementations may signal information related to both GDR and ROI.

FIG. 5 is a flow diagram illustrating an example method related to GDR and implementing one or more aspects of this disclosure. In various examples in accordance with the systems and methods described herein, a video encoder 20 or video decoder 30 may code information indicating whether GDR of pictures is enabled (500). For example, entropy encoding unit 56 in video encoder 20 may encode information indicating whether GDR of pictures is enabled or entropy decoding unit 70 of video decoder 30 may decode information indicating whether GDR of pictures is enabled. Hence, coding may refer to encoding or decoding. In some examples, when GDR is enabled, a video encoder 20 or video decoder 30 may code information indicating whether slices belong to a foreground region of a picture (502). In some examples, if GDR is enabled, then, e.g., video decoder 30 will look for the foreground information (e.g., in a slice header or in SEI message. Entropy encoding unit 56 in video encoder 20 may, in an example, code information indicating whether slices belong to a foreground region of a picture or entropy decoding unit 70 of video decoder 30 may code information indicating whether slices belong to a foreground region of a picture. Some examples may code such information as part of a slice header, e.g., as a flag or other syntax element, in an SEI message. In some examples, a processor or processors in an apparatus implementing the method may be configured to perform one or more of these steps.

In some examples, video encoder 20 or video decoder 30 may code information indicating pictures corresponding to GDR starting point and a GDR recovery point (504). Additionally, in some examples, video encoder 20 or video decoder 30 may code video data corresponding to the slices belonging to the foreground regions between the GDR starting point and the GDR recovery point.

In some examples, video encoder 20 or video decoder 30 may code information to indicate whether GDR is enabled by coding the information in one of a sequence parameter set, video parameter set or picture parameter set to indicate whether GDR is enabled.

In some examples, a video coder may be further configured to code information indicating whether a slice belongs to a foreground region of a picture by coding the information in a slice header or an SEI message to indicate whether the slice belongs to the foreground region of the picture. The information may, for example, be indicated by an SEI message or a flag or syntax element in a slice header. Examples that use an SEI message to indicate whether the slice belongs to the foreground region of the picture may send one SEI message per slice or an SEI message could apply to a series of slices. In some examples, a predetermined number of slices may be indicated by the SEI message. In another example, an SEI message could apply to a series of slices until the next SEI message is received. For example, a foreground flag in the SEI message may indicate a status for one or more following slices received before a next SEI message. A flag in a slice header might have similar functionality. The flag may be sent once for each slice or the flag could apply to a series of slices or a known number of slices. In some examples, using a flag in an SEI message or a flag in a slice header, foreground or background may be explicitly indicated. The video coder may be a video encoder 20 or video decoder 30.

In accordance with some examples described herein, systems, methods, and apparatus may receive the information in an encoded video bitstream, decode the information, and decode video data using the information. These examples may also decode slices that belong to the foreground region and discard slices that do not belong to the foreground region.

In another example, systems, methods, and apparatus may be further configured to generate video data corresponding to a foreground region based on the decoded slices that belong to the foreground region. In another example, systems, methods, and apparatus may be configured to perform random access from a GDR starting point, decoding slices in pictures from the GDR starting point to a GDR recovery point that belong to the foreground region, and discarding slices in pictures from the GDR starting point to the GDR recovery point that do not belong to the foreground region.

FIG. 6 is a flow diagram illustrating an example method related to ROI and implementing one or more aspects of this disclosure. In the illustrated example, an apparatus for coding video data, such as video encoder 20 or video decoder 30, may include a processor or processors configured to code information indicating whether the use of one or more ISPs are enabled (600) for particular slices. Additionally, when independent sub-pictures are enabled, the apparatus codes information indicating an ISP ID for one of the ISPs (602). The processor or processors may also be configured to code video data corresponding to an ROI as one of the ISPs (604). In one example, an SEI message or slice header indicates an ISP ID for a slice or multiple consecutive slices in the case of an SEI message. Video decoder 30 uses that ISP ID to identify the slices that correspond to the ROI and decodes them. Some examples may use an ISP ID to indicate slices that are in the ROI ISP. SEI messages may also associate ISP IDs with slices.

In accordance with this disclosure, systems, methods, or apparatus for coding video data may code information to indicate whether ISPs are enabled comprises coding the information in one of a sequence parameter set, video parameter set or picture parameter set to indicate whether ISPs are enabled. The systems, methods, or apparatus for coding video data may also code information indicating ISP IDs for each of one or more ISPs comprises coding the information in a slice header or an SEI message to indicate ISP IDs for each of one or more ISPs. The information may, for example, be indicated by an SEI message or a flag or syntax element in a slice header. In some examples, an ISP ID in an SEI message or in a slice header may be provided. Accordingly, some example systems may determine an ROI based on the ISP ID. For example, some systems may determine if one or more of the slices is an ROI or non-ROI slice based on the ISP ID These systems, methods, or apparatus for coding video data may associate one or more video data slices with the ISPs. In accordance with this disclosure, systems, methods, or apparatus for coding video data may code ISP characteristics including a number of the ISPs, positions of the ISPs and sizes of the ISPs in a coded video sequence. These systems, methods, or apparatus may code the ISP characteristics in one of an SEI message, a sequence parameter set, video parameter set, or picture parameter set.

In some examples, video decoder 30 may use the ISP ID's in decoding the ROI. For example, an SEI message may indicate an ISP ID. The slices that follow the SEI message may be associated with the same ISP until the next SEI message. This can be similar to the methodology used with respect to GDR discussed with respect to FIG. 4. In some examples, an ISP ID may be used for all of the slices in the ROI. Slices with a special value of ISP ID (invalid value, for example) may also be used. For examples, a null value may also be used to indicate slices that are not in the ROI. It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving, in an encoded video bitstream, a flag in one of a supplemental enhancement information (SEI) message or a slice header;
   decoding the flag to determine whether gradual decoder refresh (GDR) is enabled with respect to a picture that is not available for random access decoding; and
   when the decoded flag indicates that GDR is enabled with respect to the picture that is not available for random access decoding, decoding information that indicates whether one or more slices of the picture belong to a foreground region of the picture,
      wherein the foreground region of the picture represents a region of the picture that has been refreshed according to GDR, and
      wherein a background region of the picture represents a region of the picture different from the foreground region that has not been refreshed according to GDR.

2. The method of claim 1, wherein the SEI message comprises a region_refresh SEI message.

3. The method of claim 1, wherein the foreground region of the picture comprises one or more slices, the method further comprising decoding information indicating a picture that represents a GDR starting point of a GDR sequence and a picture that represents a GDR recovery point of the sequence, the picture representing the GDR recovery point being available for random access decoding.

4. The method of claim 3, further comprising decoding video data corresponding to slices belonging to foreground regions of one or more pictures of the GDR sequence that are positioned between the picture that represents the GDR starting point and the picture that represents the GDR recovery point in decoding order.

5. The method of claim 4, further comprising discarding video data corresponding to any slices belonging to background regions of the one or more pictures positioned between the picture that represents the GDR starting point and the picture that represents the GDR recovery point in decoding order.

6. The method of claim 1, further comprising generating video data corresponding to the foreground region of the picture based on the one or more slices of the picture that belong to the foreground region of the picture.

7. A method of encoding video data, the method comprising:
   encoding a flag that indicates whether gradual decoder refresh (GDR) is enabled with respect to a picture that is not available for random access decoding;
   when GDR is enabled with respect to the picture that is not available for random access decoding, encoding information that indicates whether one or more slices of the picture belong to a foreground region of the picture,
      wherein the foreground region of the picture represents a region of the picture that has been refreshed according to GDR, and
      wherein a background region of the picture represents a region of the picture different from the foreground region that has not been refreshed according to GDR; and
   signaling, in an encoded video bitstream, in one of a supplemental enhancement information (SEI) message or a slice header, the flag that indicates whether GDR is enabled.

8. The method of claim 7, wherein the SEI message comprises a region_refresh SEI message.

9. The method of claim 7, wherein the foreground region of the picture comprises one or more slices, the method further comprising encoding information indicating a picture that represents a GDR starting point of a GDR sequence and a picture that represents a GDR recovery point of the GDR sequence.

10. The method of claim 9, further comprising encoding video data corresponding to slices belonging to foreground regions of one or more pictures of the GDR sequence that are positioned between the picture that represents the GDR starting point and the picture representing the GDR recovery point in decoding order.

11. An apparatus for decoding video data, the apparatus comprising:

a memory device configured to store at least a portion of an encoded video bitstream; and one or more processors configured to:
 decode, from the stored portion of the encoded video bitstream, a flag in one of a supplemental enhancement information (SEI) message or a slice header;
 decode the flag to determine whether gradual decoder refresh (GDR) is enabled with respect to a picture that is not available for random access decoding; and
 when the decoded flag indicates that GDR is enabled with respect to the picture that is not available for random access decoding, decode information that indicates whether one or more slices of the picture belong to a foreground region of the picture,
  wherein the foreground region of the picture represents a region of the picture that has been refreshed according to GDR, and
  wherein a background region of the picture represents a region of the picture that has not been refreshed according to GDR.

12. The apparatus of claim 11, wherein the SEI message comprises a region_refresh SEI message.

13. The apparatus of claim 11, wherein the foreground region of the picture comprises one or more slices, and wherein the one or more processors are further configured to code information indicating a picture that represents a GDR starting point and a picture the represents a GDR recovery point of the sequence, the picture representing the GDR recovery point being available for random access decoding.

14. The apparatus of claim 13, wherein the one or more processors are further configured to decode video data corresponding to slices belonging to foreground regions of one or more pictures of the GDR sequence that are positioned between the picture representing the GDR starting point and the picture representing the GDR recovery point in decoding order.

15. The apparatus of claim 14, wherein the one or more processors are further configured to discard video data corresponding to any slices belonging to background regions of the one or more pictures positioned between the picture that represents the GDR starting point and the picture that represents the GDR recovery point in decoding order.

16. The apparatus of claim 11, wherein the one or more processors are further configured to generate video data corresponding to the foreground region of the picture based on the one or more slices of the picture that belong to the foreground region of the picture.

17. The apparatus of claim 11, further comprising a display device configured to display reconstructed video data.

18. The apparatus of claim 11, further comprising at least one of:
 one or more integrated circuits;
 one or more microprocessors;
 one or more digital signal processors (DSPs);
 one or more field programmable gate arrays (FPGAs);
 a desktop computer;
 a laptop computer;
 a tablet computer;
 a phone;
 a television;
 a camera;
 a display device;
 a digital media player;
 a video game console;
 a video game device;
 a video streaming device; or
 a wireless communication device.

19. An apparatus for coding video data, the apparatus comprising:
 means for receiving, in an encoded video bitstream, a flag in one of a supplemental enhancement information (SEI) message or a slice header;
 means for decoding the flag to determine whether gradual decoder refresh (GDR) is enabled with respect to a picture that is not available for random access decoding; and
 means for decoding information that indicates whether one or more slices of the picture belong to a foreground region of the picture when the decoded flag indicates that GDR is enabled with respect to the picture that is not available for random access decoding,
  wherein the foreground region of the picture represents a region of the picture that has been refreshed according to GDR, and
  wherein a background region of the picture represents a region of the picture different from the foreground region that has not been refreshed according to GDR.

20. The apparatus of claim 19, wherein the SEI message comprises a region_refresh SEI message.

21. The apparatus of claim 19, wherein the foreground region of the picture comprises one or more slices, and wherein the apparatus further comprises means for decoding information indicating a picture that represents a GDR starting point of a GDR sequence and a picture that represents a GDR recovery point of the sequence, the picture that represent the GDR recovery point being available for random access decoding.

22. The apparatus of claim 21, further comprising means for decoding video data corresponding to slices belonging to foreground regions of one or more pictures of the GDR sequence that are positioned between the picture that represents the GDR starting point and the picture that represents the GDR recovery point in decoding order.

23. The apparatus of claim 22, further comprising means for discarding video data corresponding to any slices belonging to background regions of the one or more pictures positioned between the picture that represents the GDR starting point and the picture that represents the GDR recovery point in decoding order.

24. The apparatus of claim 19, further comprising means for displaying reconstructed video data.

25. The apparatus of claim 19, further comprising at least one of:
 one or more integrated circuits;
 one or more microprocessors;
 one or more digital signal processors (DSPs);
 one or more field programmable gate arrays (FPGAs);
 a desktop computer;
 a laptop computer;
 a tablet computer;
 a phone;
 a television;
 a camera;
 a display device;
 a digital media player;
 a video game console;
 a video game device;
 a video streaming device; or
 a wireless communication device.

26. A computer-readable storage medium having stored thereon instructions that, when executed, cause one or more processors of a video decoding device to:

receive, in an encoded video bitstream, a flag in one of a supplemental enhancement information (SEI) message or a slice header;

decode the flag to determine whether gradual decoder refresh (GDR) is enabled with respect to a picture that is not available for random access decoding; and when the decoded flag indicates that GDR is enabled with respect to the picture that is not available for random access decoding, code information that indicates whether one or more slices belong to a foreground region of the picture, wherein the foreground region of the picture represents a region of the picture that has been refreshed according to GDR, and wherein a background region of the picture represents a region of the picture different from the foreground region that has not been refreshed according to GDR.

27. The computer-readable storage medium of claim 26, wherein the SEI message comprises a region_refresh SEI message.

28. The computer-readable storage medium of claim 26, wherein the foreground region of the picture comprises one or more slices, and wherein the instructions, when executed, further cause the one or more processors to decode a picture that represents a GDR starting point and a picture that represents a GDR recovery point of the sequence, the picture that represents the GDR recovery point being available for random access decoding.

29. The computer-readable storage medium of claim 28, further having stored thereon further instructions that, when executed, cause the one or more processors to decode video data corresponding to slices belonging to foreground regions of one or more pictures of the GDR sequence that are positioned between the picture that represents the GDR starting point and the picture that represents the GDR recovery point in decoding order.

30. The computer-readable storage medium of claim 29, having stored thereon further instructions that, when executed, cause the one or more processors to discard video data corresponding to any slices belonging to background regions of the one or more pictures positioned between the picture that represents the GDR starting point and the picture that represents the GDR recovery point in decoding order.

* * * * *